March 6, 1945. J. R. SCHONBERG 2,370,816
TREATING HYDROCARBON FLUIDS
Filed Oct. 1, 1940 3 Sheets-Sheet 1

Jackson R. Schonberg Inventor
By P.R. Young Attorney

March 6, 1945. J. R. SCHONBERG 2,370,816
TREATING HYDROCARBON FLUIDS
Filed Oct. 1, 1940 3 Sheets-Sheet 2

Jackson R. Schonberg Inventor
By [signature] Attorney

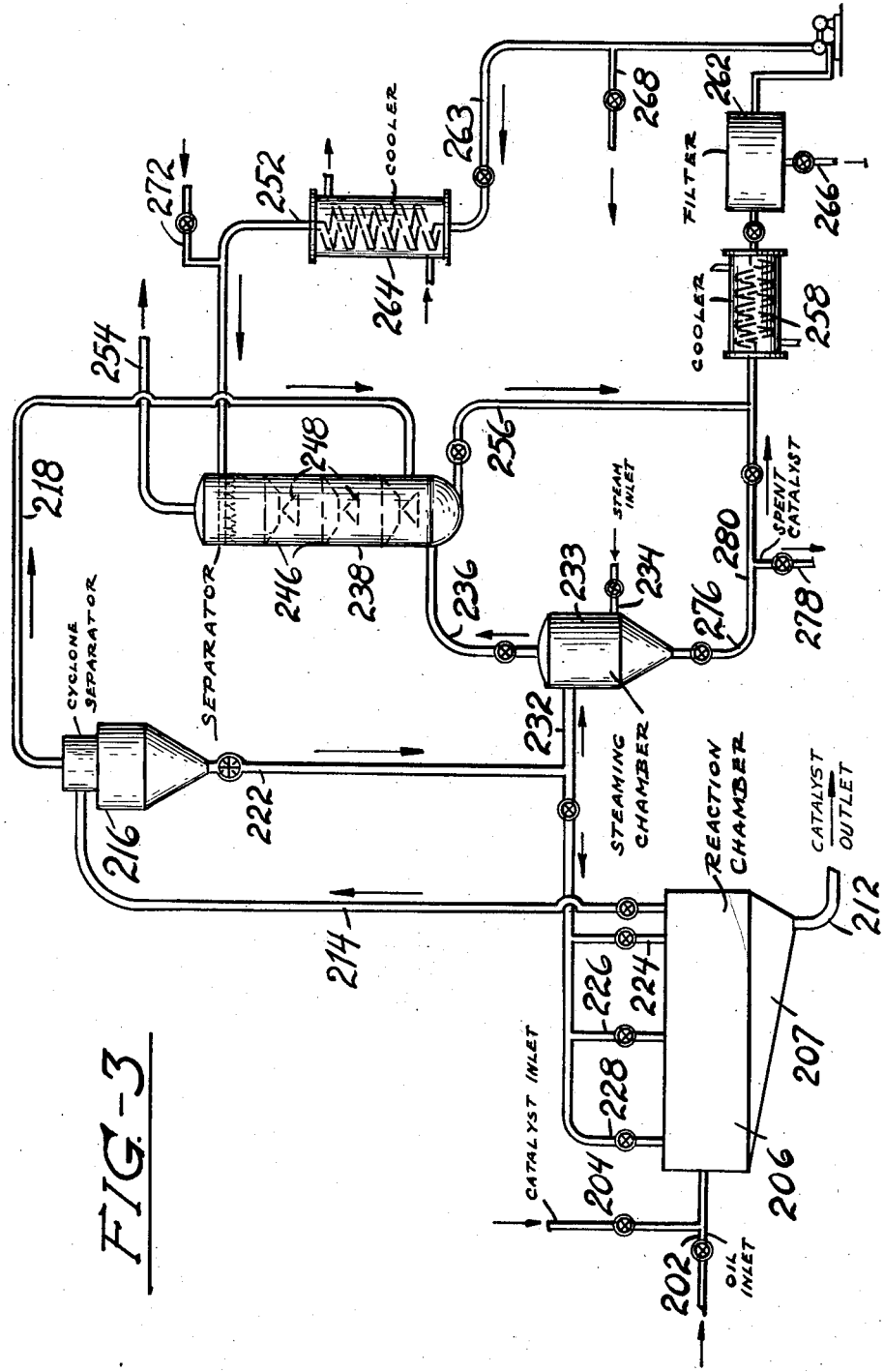

Patented Mar. 6, 1945

2,370,816

UNITED STATES PATENT OFFICE 2,370,816

TREATING HYDROCARBON FLUIDS

Jackson R. Schonberg, Westfield, N. J., assignor to Standard Oil Development Company, a corporation of Delaware Application October 1, 1940, Serial No. 359,195

3 Claims. (Cl. 196—52)

This invention relates to the catalytic conversion of hydrocarbons.

When using powdered catalyst for the conversion of hydrocarbons, where the hydrocarbon vapors and powdered catalyst are passed through a reaction zone, it is necessary to remove substantially all of the powdered catalyst from the reaction products in order to have an economical process. If substantially all of the powdered catalyst is not removed, some of the finer powdered catalyst will leave the system with the gases and this loss will be a continuous one. Generally a separator such as a cyclone separator is used but the vapors leaving such a separator still contain an appreciable amount of powdered catalyst.

According to my invention the powdered catalyst is removed substantially completely from the reaction product vapors. In the preferred form of my invention the reaction products in vapor form are passed to a suitable separating device such as a cyclone separator or the like to separate vapors from most of the powdered catalyst. The vapors leaving the separating device contain an appreciable amount of powdered catalyst and according to my invention, these vapors are then passed to a suitable chamber wherein they are mixed with a relatively heavy oil as a reflux liquid to wash out or scrub out remaining powdered catalyst in the vapors. At the same time there is a condensation of the heavy fractions in the vapors and this condensation provides additional reflux liquid for scrubbing or washing the vapors. The remaining vapors are then passed to suitable fractionating equipment to separate desired products.

The scrubbing oil containing the catalyst powder is withdrawn from the scrubbing chamber and filtered to remove the catalyst particles from the oil and the filtered catalyst is regenerated in any suitable manner, all or part of the filtered oil being recycled to the scrubbing chamber as reflux. Fresh oil may be added to the scrubbing chamber as reflux or scrubbing liquid. In the filtering step continuous filters are preferably used.

The powdered catalyst separated from the reaction product vapors in the separating device is steamed to separate oil therefrom. During the steaming operation some of the catalyst powder is carried along with the steam and preferably this steam containing some catalyst particles is passed to the scrubbing chamber so as to remove the catalyst particles from the steam. The powdered catalyst after steaming is regenerated in any suitable manner as by burning. If desired, all or part of the steamed powdered catalyst may be mixed with the reflux oil from the scrubbing chamber and the entire mixture filtered. The powdered catalyst after regeneration is preferably recycled to the reaction zone with additional quantities of hydrocarbons to be converted.

A portion or portions of the catalyst separated from the reaction products in the separating device may be introduced into the reaction zone at one point or spaced points to increase the concentration of the catalyst in the hydrocarbon as the conversion progresses.

In another form of the invention the vapors from the separating device and all or a portion of the separated powdered catalyst may be passed to one scrubbing chamber, or all of the powdered catalyst may be removed and regenerated. The reaction product vapors are scrubbed or washed with reflux oil to scrub out or wash out remaining powdered catalyst from the vapors leaving the separating device and which are introduced into the scrubbing chamber. In the above forms of my invention, the reaction chamber or zone is provided with a spiral baffle to give the mixture of hydrocarbon vapors and powdered catalyst a spiral path through the reaction zone.

In a third form of my invention, the reaction chamber is placed horizontally and the hydrocarbon vapors and powdered catalyst are introduced into one end of the reaction chamber. The reaction products and some powdered catalyst are removed from a point adjacent the other end of the horizontally arranged reaction chamber. In this form of my invention I take advantage of the natural tendency of the catalyst particles to separate by gravity. As the vapors and powdered catalyst pass horizontally through the reaction chamber, the catalyst particles tend to settle out and collect on the bottom of the reaction chamber. These catalyst particles are removed and regenerated in any suitable manner. The reaction products in vapor form and some of the finer particles of catalyst leave the other end of the reaction chamber and are passed through a separating device such as a cyclone separator to separate vapors from powdered catalyst. The vapors leaving the separating device are introduced into a scrubbing chamber similar to those described above. A portion or portions of the separated catalyst from the separating device may be returned to the reaction chamber at spaced points so as to increase the amount of catalyst to oil as the conversion progresses through the reaction chamber.

In my invention the catalyst particles are washed or scrubbed from the vapors by a hot reflux liquid which is cooler than the vapors and at the same time the vapors are desuperheated.

Figure 1:
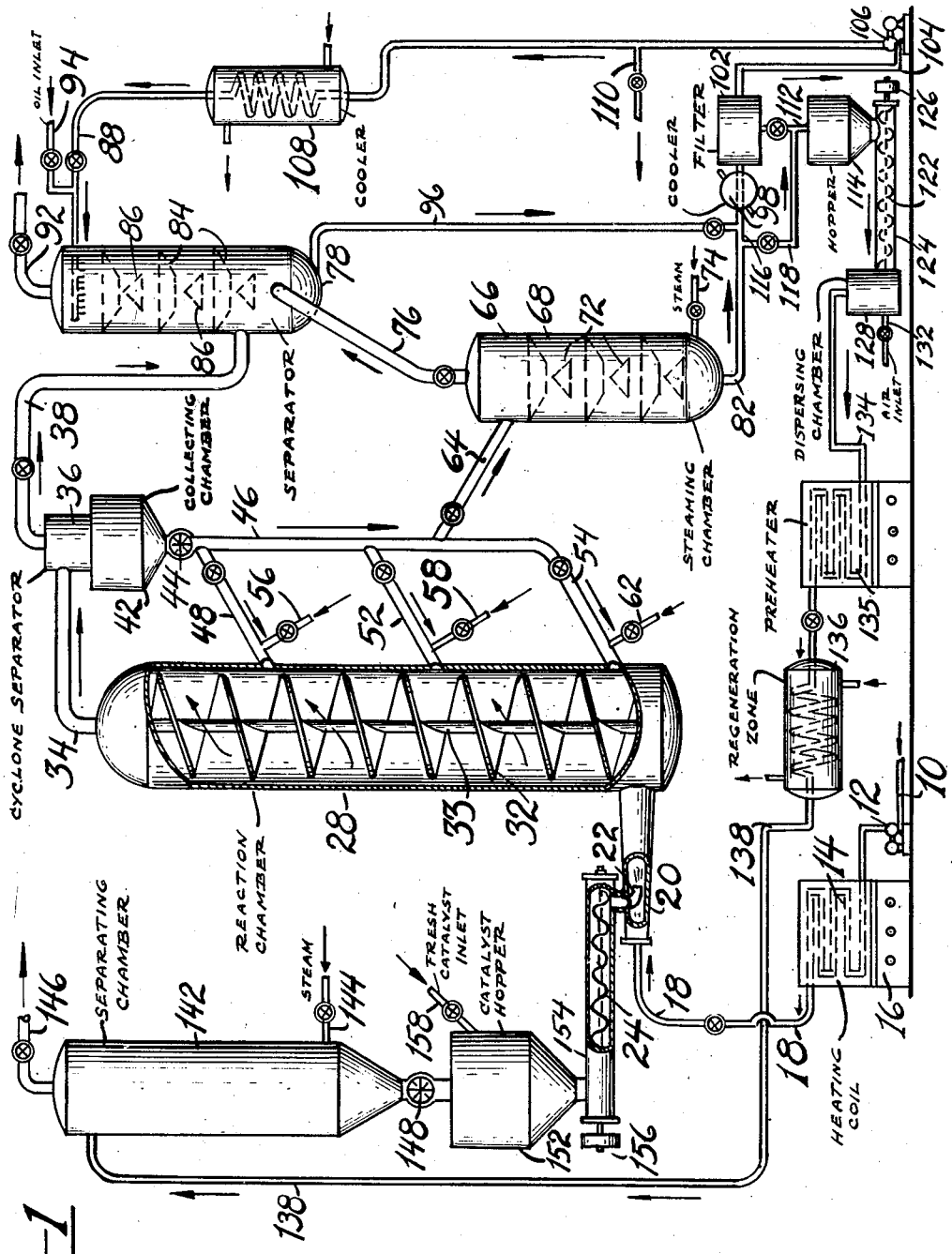
Figure 1 represents one form of apparatus adapted for practicing the preferred form of my method.

Referring now to the drawings and to Figure 1, the reference character 10 designates a line through which a relatively heavy hydrocarbon oil such as gas oil or the like is passed by means of pump 12. Other hydrocarbon fluids may be used. The hydrocarbon oil is passed through a heating coil 14 arranged in a furnace or heater 16 to raise the temperature of the oil and to substantially completely vaporize the oil. The heated hydrocarbon vapors leave the heating coil 14 and are passed through line 18 and into the line 20 where they are mixed with powdered catalyst introduced through nozzle or pipe 22. The powdered catalyst is fed to the pipe 22 by means of the screw mechanism 24.

The mixture of hydrocarbon vapors and powdered catalyst is introduced into the lower portion of the reaction chamber 28 which is shown as a vertically arranged cylindrical chamber. The interior of the reaction chamber 28 is provided with a continuous spiral baffle 32 which is arranged around a vertical axis 33. The spiral baffle 32 may be stationary or rotatable but is preferably stationary. The spiral baffle is so proportioned as to provide the proper velocity of the catalyst and hydrocarbon vapor mixture through the reaction chamber and also to provide the proper time of contact to effect the desired extent of conversion. By using a spiral baffle, it is possible to reduce the length of the reaction chamber and in this way small equipment may be used.

The reaction products and the powdered catalyst leave the top of the reaction chamber through line 34 and are introduced into a separating device 36 of suitable construction. As shown in the drawings, the separating device is a cyclone separator but other separating devices may be used. In the separator 36, the reaction products or products of conversion are separated from a large portion of the powdered catalyst, the vapors passing overhead through line 38 and the dry powdered catalyst particles collecting in the collecting chamber 42. The vapors passing through line 38 are further treated according to my invention to separate substantially all of the catalyst particles therefrom and this will be described in greater detail hereinafter.

The catalyst particles collecting in the lower portion of the collecting chamber 42 are withdrawn therefrom by means of a star feeder 44 and are passed through line 46. All or a portion of the separated catalyst particles may be returned to the reaction chamber 28. In the drawings I have shown branch valved lines 48, 52 and 54 for introducing the separated catalyst particles into the reaction chamber 28 at spaced points. For example, line 48 communicates with the upper portion of the reaction chamber 28, line 52 communicates with an intermediate portion of the reaction chamber 28 and line 54 communicates with the lower portion of the reaction chamber 28. By returning the catalyst particles to the different places in the reaction chamber, the concentration of the catalyst in the hydrocarbon vapors is changed and in the particular form shown, the concentration of the catalyst increases as the hydrocarbon vapors pass through the reaction chamber or as the conversion progresses. These branch lines may be placed at other points in the reaction chamber and I am not to be restricted to the exact location nor exact number shown in the drawings. If desired, jets of steam or vaporized hydrocarbons from line 18 may be introduced into the respective branch lines 48, 52 and 54 through lines 56, 58 and 62 to facilitate introduction of the catalyst particles into the reaction chamber.

During the conversion operation, the catalyst particles become covered with carbonaceous deposits which reduce the activity of the powdered catalyst. In order to maintain the activity, it is necessary to regenerate the catalyst particles which had been used in the conversion operation. One form of regeneration comprises mixing the catalyst particles with air or other gas containing free oxygen and burning the carbonaceous deposit from the catalyst particles. This regeneration step produces large quantities of heat and it is necessary to carefully control the temperature during regeneration so as not to destroy the activity of the catalyst.

The powdered catalyst to be regenerated leaving the collecting chamber 42 through line 46 is passed through line 64 and introduced into the upper portion of a steaming chamber 66. The chamber 66 is provided with inclined baffles 68 and cones 72. Steam is introduced through line 74 into the lower portion of the steaming chamber 66 and passes upwardly through the chamber. The catalyst particles fall downwardly in the chamber 66 and the baffles and cones provide intimate contact between the steam and the catalyst particles and in this way the catalyst particles are de-oiled. During this steaming operation, some of the smaller particles of catalyst are carried along with the outgoing steam and this outgoing steam leaves the top of the chamber 66 through line 76 and is introduced into the lower portion of a second separating device 78 to separate the catalyst particles from the steam as will be presently described in greater detail.

The steamed and de-oiled catalyst particles collect at the bottom of the chamber 66 and are withdrawn therefrom by means of line 82. The further treatment of these catalyst particles will be described in greater detail hereinafter.

Returning now to the second separating chamber 78, it will be seen that the vaporous reaction products or products of conversion leaving the first separating device 36 through line 38 are introduced into the lower portion of the second separating device 78. The second separating device 78 is provided with a plurality of inclined baffles 84 and cones 86 for providing intimate contact between the reflux or scrubbing oil introduced into the upper portion of the separating device 78 by means of line 88 and the gas or vapor steams introduced into the lower portion of the separating device 78. This reflux oil is preferably a relatively heavy oil substantially free of light constituents. For example, the condensate oil or bottoms from the fractionator (not shown), wherein the vapors from the second separator 78 and passing through line 92 are fractionated, may be used.

As above pointed out, the products of conversion passing through line 38 and the steam passing through line 76 contain catalyst particles and the second separating device 78 is provided for substantially completely removing such catalyst particles from the vapors and gases. The vapors and gases after being scrubbed or washed by the reflux liquid, pass overhead through line 92 and are further treated in any suitable manner as by fractionation, for example, to separate desired products.

During the scrubbing of the vapors and gases, the heavier fractions in the vapors introduced through line 38 are condensed and these heavy fractions are added to the reflux liquid and a part of the total liquid is preferably recycled as reflux liquid. Means are also provided by line 94 for introducing a fresh oil as reflux liquid for introduction into the top portion of the second separating device 78.

The reflux liquid and the heavier fractions which were condensed in the separating device 78, together with the catalyst particles scrubbed out of the vapors and gases are withdrawn from the bottom of the second device 78 by means of line 96, passed through cooler 98 to reduce the temperature of the liquid and the cooled liquid is then passed through filter 102 to separate the catalyst particles from the liquid oil. Preferably the filter 102 is a continuous filter. The oil which is separated during the filtering is passed through line 104 by pump 106 and is further cooled by means of cooler 108 and is then returned as reflux liquid to the top of the second separating device 78. It is to be noted that while the reflux liquid is hot, it is at a lower temperature than the products of conversion passing through the separating device 78 and in this way condensation of the heavier fractions in the reaction products is brought about. In addition, the reaction product vapors are desuperheated. A portion of the filtered oil may be withdrawn from the system through line 110, if desired.

The filtered catalyst particles are taken from the filter and passed through line 112 to a collecting chamber 114. It is preferable to further treat these filtered catalyst particles in any suitable manner before introducing them into the chamber or hopper 114 so as to remove oil from the catalyst particles. In one method the catalyst particles may be washed relatively free of oil by using a light wash liquid such as naphtha rerun bottoms and this light liquid can then be removed by steaming. The resulting catalyst particles are substantially dry and can be conveyed pneumatically, or the filtered catalyst may be flushed from the filter and pumped as a slurry to the regeneration zone. The oil used for flushing should be a cheap refinery fuel such as heavy pitch or cracked tar.

The steamed catalyst particles leaving the steaming chamber 66 through line 82 may be either mixed with the reflux liquid passing through line 96 and filter 102 or the steamed catalyst particles may be directly passed to the regeneration zone. Or, a part of the steamed catalyst particles may be passed to the regeneration zone and the rest mixed with the oil slurry containing reflux liquid withdrawn from the bottom of the second separating device 78. A line 116 is provided for mixing the steamed catalyst particles with the oil slurry containing reflux liquid and a line 118 is provided for transferring the steamed catalyst particles to the hopper 114.

The catalyst particles collecting in the hopper 114 are withdrawn from the bottom thereof by means of a screw mechanism 122 which is positioned in a barrel 124. The screw mechanism is rotated by any suitable means as a pulley 126. The catalyst particles which are to be regenerated are introduced into a dispersing chamber 128 where they are mixed with air introduced through line 132. The suspension of catalyst particles in air is then passed through line 134 and heater 135 for raising the temperature of the catalyst particles to about 850° F. so that burning of the carbonaceous deposits on the catalyst particles will be initiated. The mixture of catalyst particles and air is then passed through a heat exchange chamber 136 for removing heat from the catalyst suspension during regeneration. As the carbonaceous material burns, there is a large production of heat and it is necessary to remove this heat in order to prevent overheating of the catalyst particles. A salt bath or the like may be used to remove the heat by indirect heat exchange during regeneration.

The regenerated catalyst and products of combustion leave the heat exchanger 136 through line 138 and the regenerated catalyst particles are introduced into a separating chamber 142 of any suitable construction for separating products of combustion from regenerated catalyst particles. A cyclone separator or separators may be used. The gaseous products leave the top of the separator 142 through line 146. Steam is preferably introduced in the lower portion of the chamber 142 by means of line 144 in order to remove any free oxygen which may be present in the chamber 142.

The regenerated catalyst particles collect in the bottom of the chamber 142 and are withdrawn therefrom by means of star feeder 148 and are introduced into a hopper 152 from which they pass into a barrel 154.

The screw mechanism 24, above described, is positioned in the barrel 154. Suitable means such as pulley 156 are provided for rotating the screw mechanism. The regenerated catalyst particles are then introduced into a stream of hydrocarbon vapors for another conversion operation. Fresh catalyst may be introduced into hopper 152 by means of line 158.

The form of my invention shown in Figure 2 of the drawings will now be described. The apparatus shown in Figure 2 differs from that shown in Figure 1 mainly in that one separator is used for separating the catalyst particles from vapors by means of a reflux liquid rather than two separators as shown in Figure 1. Up to and including the first separating device 36, discharge line 46 and branch lines 48, 52, and 54, the apparatus is substantially the same and the same reference characters have been used as in Figure 1 to designate the same parts. The regeneration apparatus in Figure 2 is substantially the same as in Figure 1 and the same reference characters have been used to designate the same parts.

Figure 2:
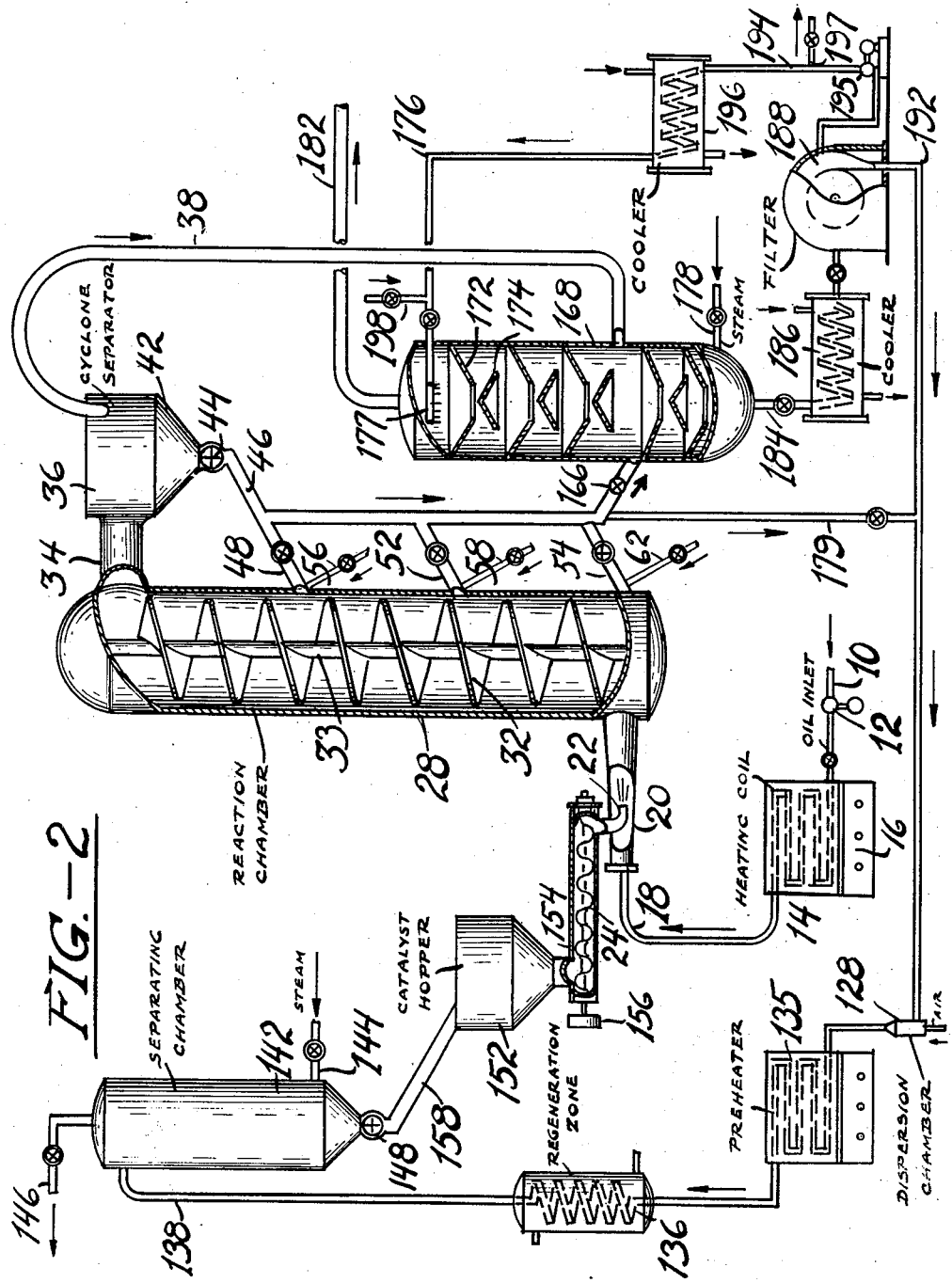
Figure 2 represents another arrangement of apparatus for practicing another form of my invention; and, Figure 3 represents still another arrangement of apparatus for practicing my invention.

In Figure 2 the separated catalyst particles from the chamber 42 are passed through the star feeder 44 and into line 46. Some of the separated catalyst is returned to the reaction chamber at spaced points by branched lines 48, 52 and 54 similar to that shown in Figure 1. All or a portion of the catalyst separated from the chamber 42 may be passed through line 166 into a separating device 168 provided with inclined baffles 172 and cones 174. The catalyst particles are introduced into the lower portion of the separating chamber 168. The vapors passing overhead from the first separating device 36 and containing reaction products and some catalyst particles are passed through line 38 and introduced into an intermediate portion of the second separating device 168.

Hot reflux liquid is introduced into the top portion of the separating chamber 168 by means of line 176 and spray head 177. The reflux liquid flows countercurrent to the vapors containing catalyst particles and by means of the baffles 172 and cones 174 intimate contact is established between the liquid and the vapors to obtain scrubbing and washing action.

Steam is preferably introduced into the lower portion of the separating chamber 168 by means of line 178 to remove oil from the catalyst particles.

The catalyst withdrawn from the bottom of the chamber 42 through line 46 may be directly passed to the regeneration zone by means of line 179. Preferably the catalyst is steamed and de-oiled before being sent to the regeneration zone.

The reflux liquid introduced into the second separating chamber 168 is at a lower temperature than the reaction product vapors and because of this, some of the heavy fractions in the reaction product vapors are condensed. This assists in the removal of the small catalyst particles from the vapors and gases. The remaining vapors pass overhead through line 182 and are further treated as by fractionation to separate desired products. The reflux liquid and the heavy fractions together with the catalyst particles scrubbed out of the vapors and gases are withdrawn from the bottom of the separating chamber 168 by means of line 184, are cooled by means of cooler 186 and then filtered in a continuous filter or the like 188. The catalyst particles removed from the oil by the filter are passed through line 192 and are preferably further treated to remove oil therefrom before they are passed to the preheater 135 and regeneration zone 136. The filtered oil is passed through line 194 by pump 195 and cooler 196 before it is returned to the separating chamber 168 as reflux liquid. A portion of the filtered oil may be removed from the circuit through line 197. Fresh oil may be added as reflux liquid through line 198.

Figure 3 discloses an apparatus which includes scrubbing of the reaction product vapors to remove catalyst particles therefrom but has a different reaction chamber and a different arrangement of the apparatus. In this form of the invention, hydrocarbon vapors obtained in any suitable manner are passed through line 202 and mixed with powdered catalyst passing through line 204. The mixture is introduced into one end of an elongated horizontally arranged reaction chamber 206. The reaction chamber is provided with an inclined bottom 207. As the hydrocarbon vapors and catalyst pass substantially horizontally through the reaction chamber, there is a natural tendency for the catalyst particles to separate and they fall to the bottom of the reaction chamber where they are collected. The powdered catalyst after settling is removed through line 212 and may be regenerated in any suitable manner before being recycled for use in another conversion operation.

The vaporous products of conversion containing some catalyst particles leave the other end of the reaction chamber and are passed through line 214 into a first separating device 216 for separating vapors and gases from solid catalyst particles. This separation is not complete and some catalyst particles go overhead with the reaction product vapors through line 218. The solid catalyst particles separated in the separator 216 are withdrawn from the bottom thereof and passed through line 222. Portions of this catalyst may be returned and introduced into the reaction chamber 206 by means of branch lines 224, 226 and 228. By introducing the catalyst at spaced points, the catalyst concentration may be varied as the conversion progresses through the reaction chamber 206.

Another portion of the catalyst particles passing through line 222 or all of the catalyst particles may be passed through line 232 to a steaming chamber 233 into which steam is introduced into the bottom portion thereof through line 234. This steaming operation acts to remove oil from the catalyst particles before they are passed to the regeneration zone. During this steaming operation, some catalyst particles are carried along with the steam and the outgoing steam plus the fine catalyst particles are passed through line 236 and introduced into the bottom portion of a second separating device 238. The reaction product vapors leaving the first separator 216 and passing through line 218 are also introduced into the lower portion of the second separating device 238.

The second separating device 238 is provided with a plurality of inclined baffles 246 and cones 248 for providing contact between the reflux liquid and the gases and vapors. Reflux liquid is introduced into the upper portion of the separating device 238 by means of line 252. The scrubbed gases and vapors containing gasoline constituents leave the top of the second separating device 238 by means of line 254 and are further treated as desired to remove desired products therefrom.

The reflux oil and a condensed heavy fraction containing catalyst particles are withdrawn from the bottom of the separating device 238 and passed through line 256 and cooler 258 and then to a continuous filter or the like 262. The filtered oil is passed through line 263 and cooler 264 and then returned to the top of the separating device 238 as reflux liquid. The filtered catalyst particles are removed from the filter through line 266 and may be further treated in any suitable manner before they are passed to the regeneration zone. Or, they may be returned to the reaction zone 206. A portion of the filtered oil may be withdrawn through line 268. If desired, fresh reflux liquid may be introduced into line 252 by means of line 272.

The steamed catalyst particles leaving the steaming chamber 233 are withdrawn from the bottom of the chamber through line 276 and passed through line 278 to a suitable regeneration zone such as shown in Figures 1 and 2 of the drawings. If desired, all or part of the steamed catalyst particles passing through line 276 may be passed through line 280 and mixed with the slurry of reflux liquid and catalyst particles passing through line 256 and then filtered in the filter 262 and further treated as above described.

While I have shown certain arrangements of apparatus in the drawings, it is to be understood that these are by way of example only and that various modifications and changes may be made without departing from the spirit of my invention. One example of converting oil will now be given:

In Figure 1 a relatively heavy hydrocarbon oil such as gas oil is vaporized by passing through the heater 14. The hydrocarbon vapors are preferably at a temperature of about 850° F. to 1000° F. and under a pressure between about atmospheric and 300 lbs./sq. in. but preferably about 60 lbs./sq. in. The catalyst used is preferably an activated clay such as an acid treated bentonite. The mixture of powdered clay catalyst and hydrocarbon vapors remain in the reaction chamber for about 2 seconds to 2 minutes. The ratio of catalyst oil may vary from about .5 volume to 20 volumes of catalyst per volume of oil.

In the regeneration step, the temperature of regeneration is maintained below about 1200° F. and the pressure may range from about atmospheric to about 300 lbs./sq. in. The time of regeneration may vary from about 10 seconds to 20 minutes.

The above example is given by way of illustration only and I am not to be limited to this example as other temperatures and pressures may be used for different oil stocks and for different catalysts. Other cracking catalysts such as active, natural or synthetic clays, gels containing silica and alumina or the like may be used.

The reaction products leaving the top of the second separating device 78 in Figure 1 may range from about 600° F. to 875° F. The reflux liquid is preferably at a temperature of about 400° F. The amount of heavy fractions condensed from the reaction product vapors under these conditions is about 2%. About the same conditions are maintained in separator 168 in Figure 2 and separator 238 in Figure 3.

While I have described a preferred form of my invention and modifications thereof, it is to be understood that these are by way of illustration only and various changes may be made within the scope of the invention without departing from the spirit of my invention.

I claim:

1. A method of treating hydrocarbons which comprises passing hydrocarbon vapors through a horizontally arranged reaction zone together with powdered catalyst, maintaining the reaction zone at an elevated temperature to effect the desired extent of conversion of the hydrocarbons, the powdered catalyst in part settling on the bottom of the reaction zone, removing products of conversion containing powdered catalyst from said reaction zone, separating a large part of the powdered catalyst from the vapors in a first separation step, passing the vapors to a second separation step, scrubbing catalyst from the vapors in the second separation step with a hot scrubbing oil and removing the separated catalyst from the scrubbing oil.

2. A method according to claim 1, wherein at least a portion of the catalyst separated in the first separation step is returned to said reaction zone.

3. A method of treating hydrocarbons which comprises passing hydrocarbon vapors and powdered catalyst through a reaction zone maintained at an elevated temperature to effect the desired extent of conversion, separating reaction product vapors from a large portion of the powdered catalyst in a first separating zone, returning at least a portion of the separated powdered catalyst without regeneration to the reaction zone at a plurality of spaced points for increasing the ratio of catalyst to hydrocarbon vapors passing through said reaction zone, passing the reaction product vapors at substantially undiminished temperature to a scrubbing zone, scrubbing the separated reaction product vapors with a hot scrubbing oil to remove residual powdered catalyst from the reaction product vapors and separating the catalyst particles from the scrubbing oil.

JACKSON R. SCHONBERG.